Jan. 11, 1966 R. W. McPHERSON 3,228,527
WATER SEPARATING FUEL FILTER
Filed March 5, 1962 3 Sheets-Sheet 1

INVENTOR.
ROBERT W. McPHERSON
BY
P. Dunham Owen
ATTORNEY

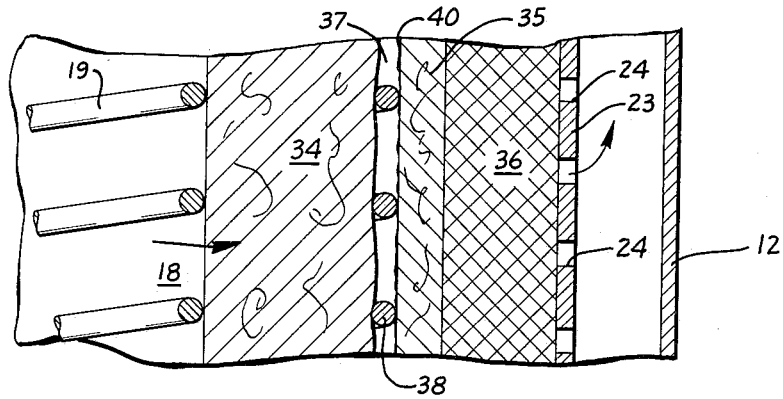
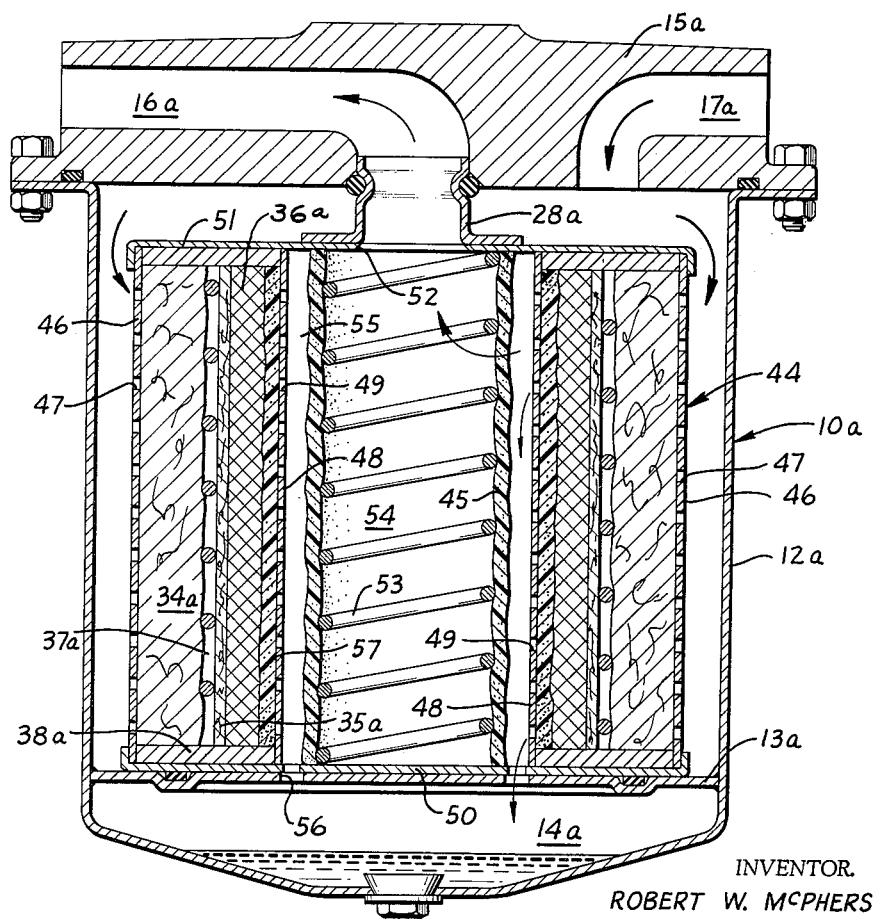

Jan. 11, 1966 R. W. McPHERSON 3,228,527
WATER SEPARATING FUEL FILTER
Filed March 5, 1962 3 Sheets-Sheet 3
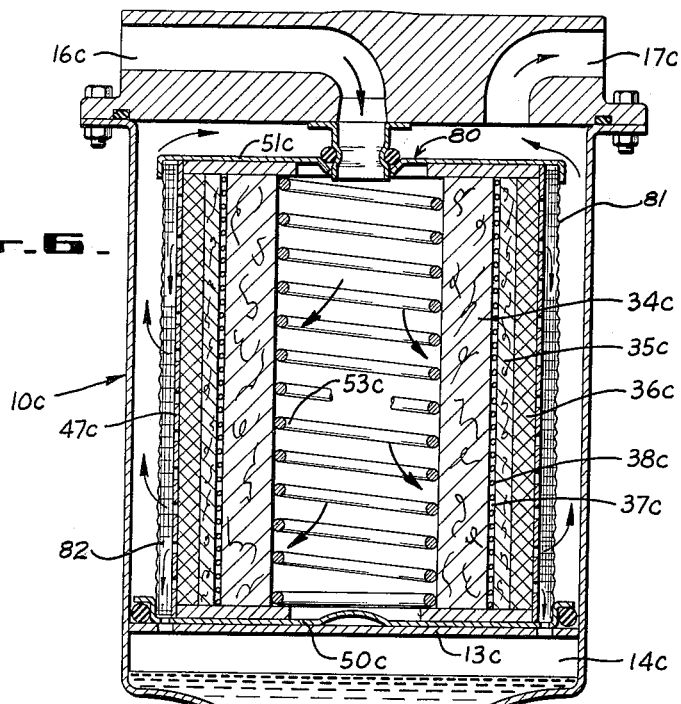
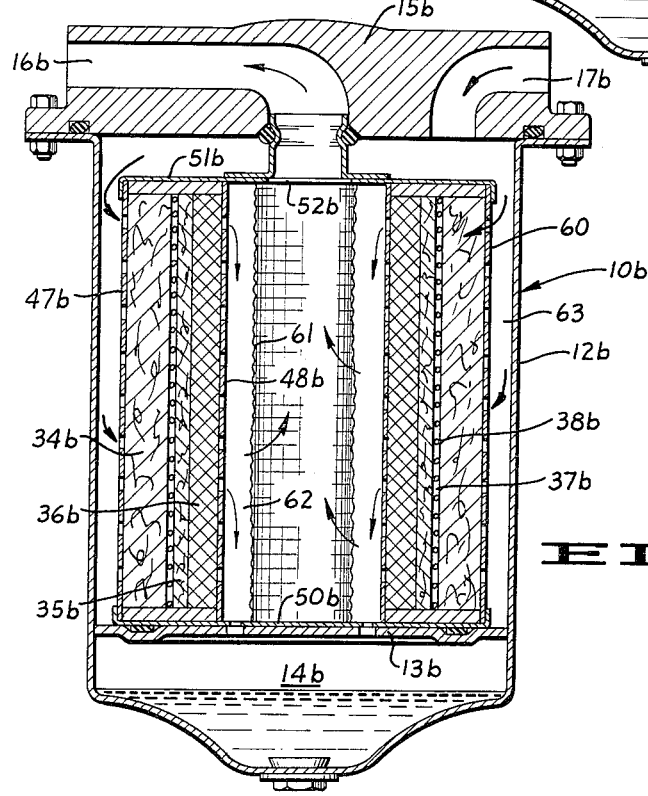
INVENTOR.
ROBERT W. McPHERSON
BY
Donham Owen
ATTORNEY

United States Patent Office 3,228,527
Patented Jan. 11, 1966

3,228,527
WATER SEPARATING FUEL FILTER
Robert W. McPherson, Concord, Calif., assignor, by mesne assignments, to Maremont Corporation, Chicago, Ill., a corporation of Illinois
Filed Mar. 5, 1962, Ser. No. 177,345
Claims priority, application Great Britain, May 17, 1961, 18,011/61
7 Claims. (Cl. 210—307)

This invention relates to fluid filtering, purifying, and separating devices. More particularly, my invention relates to a novel liquid purifying device for performing simultaneously the combined functions of filtering large and small solid particles and contaminants from a stream of hydrocarbon liquid while also freeing the hydrocarbon liquid from water suspended therein.

In many instances in the use of liquids such as hydrocarbon fuels, it is necessary to purify the liquid not only by filtering out the foreign particles but also by removing any water that is suspended in the hydrocarbon liquid. Hydrocarbon liquids such as aircraft jet fuels have a particular affinity for water and they even attract moisture from the surrounding atmosphere. Thus, despite rigidly controlled handling procedures, such fuels, during transport and storage, absorb a substantial amount of moisture. Unless this water is removed from the fuel in the aircraft's fuel system, it will form a gel-like emulsion due to low temperature conditions of normal flight and also when subjected to agitation by pumps in the system. This jelly-like emulsion clogs fuel lines, pumps, injectors, and nozzle orifices and is one of the greatest causes of "flameout," by choking off the supply of fuel to the engine.

Heretofore, the complete purification of hydrocarbon liquids including the separation of water therefrom and the removal of foreign particles and contaminants therein required a plurality separate devices arranged in series in the fluid handling system. Attempts to provide a compact single unit for performing both the water separation and filtering functions were unsuccessful because the various foreign materials and contaminants in the hydrocarbon liquid tended to accumulate on and deactivate the coalescing material for removing the water. As a result, such prior art separation and filtering units were unreliable and often became rapidly ineffective when installed.

One principal object of my invention is, therefore, to solve the aforementioned problems and to provide a liquid purifying device which combines in a single purifying unit both the functions of filtering out any suspended particles and contaminants from a stream of hydrocarbon liquid while also separating out the water particles normally suspended in the liquid.

More specifically, an object of the present invention is to provide a unitized hydrocarbon liquid purifying device for removing solid particles and contaminants as well as for freeing the hydrocarbon liquid from water suspended therein, wherein the solid particles and contaminants are prevented from sliming and thus reducing the effectiveness of the water coalescing stage.

Another object of my invention is to provide the two basic liquid purifying functions of filtering and water separation in a single unit that is compact in size and light in weight so that it is readily adaptable for use in systems having such requirements, for example, in aircraft fuel systems.

Another object of the invention is to provide such a combined filtering and water separating unit that will operate reliably for long periods at high capacity without becoming clogged or reduced in its effectiveness, and moreover, a device that will perform these liquid purifying functions efficiently without requiring high pumping pressures to produce the required rate of flow of the fluid.

Having in mind the aforementioned basic objects, the present invention contemplates a relatively simple and inexpensive purifying unit for hydrocarbon liquids comprising a single element assembly conveniently enclosed in a housing through which the liquid is made to flow. Because of a novel arrangement of various media in the purifying element embodying the principles of the invention, solid and gummy contaminants are removed from the flowing hydrocarbon liquids without sliming the coalescing portion of the unit. Thus, the coalescing action is not destroyed by the coating of the fibers of the coalescing agent as in prior art devices. My novel unit can be arranged with the flow of fuel either inside-out or outside-in with the element preferably mounted in a vertical position. For example, in the former arrangement, the hydrocarbon liquid being purified, such as jet fuel, passes first through the inner element filtering section where most or all of the solids are stripped from the fuel. Emulsified water present in the liquid then passes through the coalescing portion of the element where the finely dispersed water particles are combined into larger water droplets. The large coalesced water droplets being heavier than fuel are then settled in the outer filter sump and can be removed when desired.

An important feature of my invention is that the gums and contaminants in the hydrocarbon liquid are removed in the first and second filtering stages of my purifying unit so that they are not able to contact and coat the coalescing agent. The removal of the various contaminating agents and foreign materials is enhanced not by only the novel sequence of the filtering media but also by spacing apart of the filtering stages that prevents the fine filtering media of non-woven material from being blocked off and rendered ineffective. The accumulation of the gums and contaminants that occurs on this fine filtering media actually serves to provide an additional filtering action for sub-micronic particles. Thus, by the time the fuel reaches the coalescing agent only the water is present in solution and it is then efficiently removed from the fuel and collected.

The foregoing and other features and advantages of the present invention will be further understood from the following description when read in connection with the accompanying drawings, wherein:

FIG. 3 is an enlarged fragmentary view in elevation and in section taken along the line 3—3 of FIG. 2 illustrating the unique filtering action in a portion of the cartridge according to the invention;

FIG. 4 is a view in elevation and in section of a modified form of the invention;

FIG. 5 is a view in elevation and in section of another embodiment of the invention;

FIG. 6 is a view in elevation and in section of a somewhat modified form of the invention wherein the flow is from the outside-in.

Figure 1:
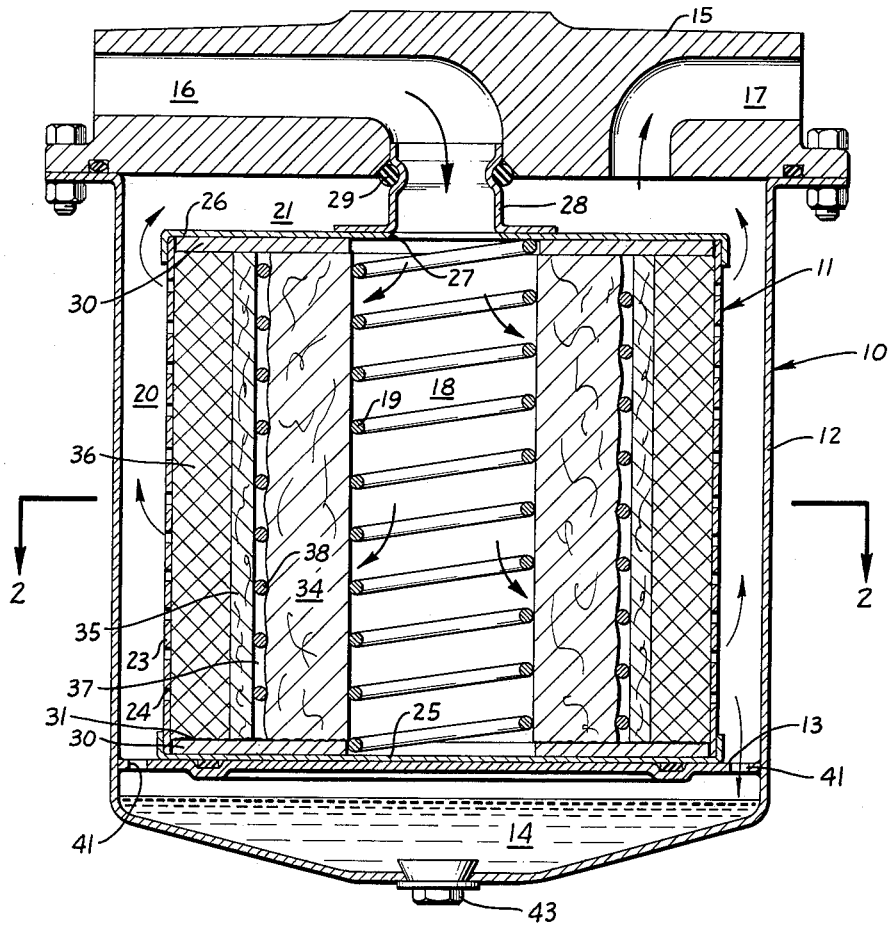
FIG. 1 is a view in elevation and in section showing one embodiment of a filtering and water separating device embodying the principles of the invention.

Referring to the drawings, a combined filtering and separating unit 10 embodying the principles of the present invention is shown in FIG. 1. It comprises generally a cartridge 11 supported within a housing 12 on a base plate 13 below which is formed a sump 14 for the accumulated water that is removed from the fuel passing through the cartridge 11. Attached to the upper portion of the housing 12 in any suitable manner as shown typically in the drawings is a top member 15 having an inlet 16 and an outlet 17. In the embodiment of FIG. 1 the inlet 16 is directed into a central cylindrical cavity 18 whose shape is maintained in the well known manner by a helical spring member 19. Thus, the flow in the unit 10 is from the inside-out, i.e., from the cavity 18 radially outward through the cartridge 11. However, as will be shown later in the specification, a cartridge embodying the principles of the invention may be constructed so that the flow is from the outside-in. The cartridge 11 is arranged within the housing 12 so that an annular space 20 is formed between it and the housing 12 and a space 21 is also provided at the top of the cartridge 11 to allow the filtered and water-free hydrocarbon liquid to flow upward and out the outlet 17 at the side of the top member 15.

The present invention provides a new combination of filtering materials or stages which are arranged in a unique order with respect to each other and to the direction of fluid flow and which thereby cooperate together in a single unit to filter and to remove the emulsified water from a hydrocarbon liquid. The cartridge 11 embodying this unique arrangement comprises generally a pervious cylindrical wall member 23 of perforated sheet metal having a plurality of openings 24. A lower end wall member 25 and an upper end wall member 26 having a central opening 27 are attached to the cylindrical member 23 in some suitable manner such as by crimping over their edges as shown. The opening 27 in the upper end wall member 26 is connected to the inlet 16 in the top cap 15 by a short conduit member 28 that is sealed around the central opening 27 in the upper end wall member 26 by an O-ring 29, or some other suitable sealing means. Adjacent to the upper and lower end wall members 26 and 25 are a pair of washers 30, of some suitable material such as a non-woven fabric, that provide end supports for retaining the various media snugly in the cartridge 11. To retain the media in the cartridge 11 and to help hold it together as a compact unit, a suitable bonding material indicated by the numeral 31 can be used on the ends of the various media and on the washers 30 adjacent to the end wall members 25 and 26.

The first stage of the cartridge 11 forms the cylindrical cavity 18 around the spring member 19 and comprises an annular layer 34 of some mechanical absorbent and/or adsorbent media, preferably a relatively coarse or cellular fibrous material such as sisal. The function of this first stage layer 34 is to filter out the large solids, to absorb and/or adsorb gummy matter, and to assist in breaking water emulsions.

Adjacent the first stage fibrous layer 34 is a second stage layer 35 comprising a relatively fine filtering media 35 that is preferably made from a non-woven fabric material having a thickness considerably less than the layer 34. Such material may comprise any suitable type of fiber or a combination of fibers such as cotton, felt, or synthetic fibers which can be formed into a non-woven layer having a substantially uniform thickness. A typical form of non-woven material is sold under the trademark WEBRIL. The function of the non-woven cloth fibers is to filter out the fine contaminants present in the hydrocarbon liquid and thereby to assist the first stage fibrous layer 34 in preventing these fine contaminants from reaching and thus causing a slime deposit on the glass fibers in a third water coalescing stage 36. It is this sliming of the coalescing media which heretofore drastically reduced the effectiveness of prior art water separation devices.

Between the first stage fibrous element 34 and the fine filtering stage 35 I provide an open space 37 of a substantially uniform annular thickness. This annular space 37 is an important and novel feature of my invention because it contributes in a large measure to the solution of the problem of removing the fine contaminants which heretofore caused the sliming of the coalescing stage 36. Any suitable spacing means 38 having a uniform thickness with relatively large openings can be used to hold the stages 34 and 35 apart and to form the space 37. For example, an expanded metal webbing or a perforated sleeve could be used. However, I prefer to use a wire or string of uniform thickness (i.e., ⅛ inch in diameter) that is wrapped in coils around the sisal element 34 with turns spaced approximately ½ inch apart to hold the fine filtering stage 35 a uniform distance away from the fibrous first stage 34. One advantage that results from having the foregoing novel arrangement, as illustrated in the enlarged fragmentary cross-sectional view of the cartridge 11 in FIG. 3, is that a pre-coat 40 of the finer contaminants or particles in the hydrocarbon liquid is allowed to build up on the non-woven fabric layer 35. This pre-coat 40 actually serves as an additional filtering means and helps to remove more of the fine contaminants from the hydrocarbon liquid down to as small as the sub-micronic range. Also, by keeping the first stage 34 and the fine-filtering stage 35 separated by the spacing means 38, these two stages 34 and 35 are prevented from bonding together due to any swelling of the various media and from thereby blinding off a large amount of the filter area of the fine filtering layer 35 which could cause it to reduce its filtering effectiveness.

Another reason why the space 37 between the first and second stages 34 and 35 is important is that it enables a certain amount of water coalescing to take place at this stage. The first stage relatively coarse material 34 such as sisal is by its nature a fair coalescer or emulsion breaker of a water-fuel emulsion and therefore some coalescing may start to take place as the hydrocarbon liquid leaves the first stage 34. Now, as the liquid enters the open space 37, further coalescing can take place and larger water droplets can form, and these droplets tend to pick up and hold colloidal contaminants or sub-micronic contaminants in suspension. These droplets can then carry the small suspended contaminants completely through the cartridge 11 to the sump 14, thereby also assisting in preventing fiber sliming of the coalescing stage 36.

The third or coalescing stage of my filtering unit 10 is formed from a layer 36 of spun fiberglass or wool glass material preferably bonded with a phenolic binder. This spun glass layer 36, which is well known as a coalescing agent, is formed completely around the Webril layer 35 and is retained in position by the pervious cylindrical wall member 23. It functions in the cartridge 11 as a coalescer but not as a filter media. One characteristic of fiberglass material is that when formed in a layer it can be compressed a limited amount, but as the fluid flows through it, it will not swell. Thus, when installed, the layer of glass fiber material 36 is preferably pre-compressed partially by some desired amount and is held in this state between the perforated sleeve 23 and the fabric layer 35. The fiberglass layer also serves in combination with the fabric layer 35 and the fibrous layer 34 to help maintain the annular space 37 between the coils of the spacing means 38 even after the cartridge 11 has been subjected to long periods of service. This feature may also be illustrated with reference to FIG. 3. When the pre-coat 40 builds up on the fabric layer 35, a pressure drop occurs in the flow therethrough resulting in a reduced pressure in the fiberglass stage 36. The layer 35 thus is pushed and flattened against the non-yielding fiberglass layer 36 because the pressure in the space 37 between it and the layer 34 is greater than the pressure downstream in the fiberglass layer 36. There is essentially no swelling in the first stage 34, and thus it cannot enlarge to encroach on the space 37 and the fabric layer 35. Therefore, the annular space 37, is preserved and kept substantially uniform even between the coils of the spacing means 38, and the layer 35 is able to perform its maximum filtering action.

When the fiberglass material 36 performs its function of coalescing the water in the hydrocarbon liquid in the cartridge 11 of FIG. 1, the outflow through the perforated sleeve 23 consists of filtered, water-free hydrocarbon liquid and coalesced water droplets. Normally, the water droplets, having a higher density than the hydrocarbon liquid, gravitate downward from the sleeve 23 as the filtered and separated fuel flows upward and out the affluent port 17 in the filter housing 12. At relatively low rates of flow through the unit 10, the water will all gravitate downward through a series of orifices 41 in the base plate 13 and into the sump 14. The orifices 41 are limited in size so that they will allow the droplets of water to flow into the sump 14 at a rate that will not affect the flow rate of the hydrocarbon liquid upward and the outlet 17 of the unit 10. A drain plug 43 is provided at the lower end of the sump 14 to remove the water that has collected therein over a period of time.

At higher rates of flow through the unit 10 the water droplets leaving the perforated sleeve 23 may not have sufficient size to fall downward into the sump 13 against the upward flow of the filtered fuel toward the outlet 17. Under such conditions, they would be swept into the fuel current and out of the unit 10. To prevent the escape of any water droplets with the fuel in such a manner, I may provide a fourth stage or droplet barrier spaced at a uniform distance from the coalescing stage to prevent the passage of water droplets into the outgoing fuel stream.

Figure 2:
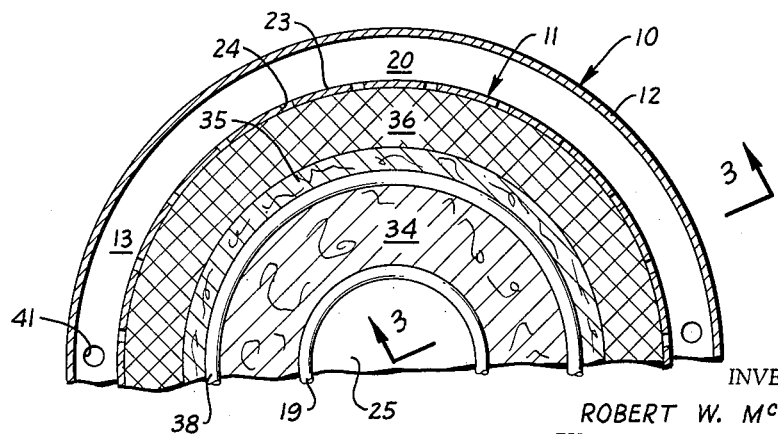
FIG. 2 is a plan view in section taken along the line 2—2 of FIG. 1.

In FIG. 4 is shown a modified unit 10a according to my invention which includes a cartridge 44, having a droplet barrier 45. The cartridge 44 is preferably constructed for flow from the outside-in and it is mounted on a base plate 13a within a housing 12a in the same manner as the cartridge 11 in FIGS. 1–3. A top member 15a is attached to the housing 12a having an inlet 17a and a central outlet 16a.

The cartridge 44 comprises a cylindrical perforated-metal outer wall member 46 having a plurality of openings 47 and a smaller concentric, cylindrical, and perforated inner wall member 48 also having a large number of openings 49, said wall members being held in place by a lower end wall member 50 and an annular upper end wall member 51 having a central opening 52. Adjacent the outer perforated wall member 46 is a first stage layer of relatively coarse fibrous material 34a such as sisal which is separated from a second stage layer 35a of non-woven fabric material by an annular space 37a formed by a spacing means 38a such as a coiled spring. Inside of the layer 35a is a third stage layer 36a of coalescing fiberglass or glass wool material. The first, second, and third filtering and water separating stages 34a, 35a, and 36a are similar to and they function in the same manner as in the embodiment of FIG. 1. However, on the cartridge 44 the droplet barrier 45 provides a fourth stage for the separation of the hydrocarbon liquid and the water droplets that are formed in the coalescing stage 36a. The barrier 45, as shown in FIG. 4, is comprised of a layer of foamed plastic material such as polyurethane having a predetermined porosity. The foam material 45 in sheet form (e.g., 1/8" thickness) is formed around a central coiled spring member 53 which forms a central cylindrical cavity 54 and holds the barrier 45 in a cylindrical shape. It is also spaced inwardly from the inner perforated wall 48, thus forming therewith an annular open area 55. Spaced apart on the lower end wall member 50 at the lower end of the annular space 55 are openings 56 which allow the heavier water droplets to fall through the base plate 13a into a sump or trap 14a below the housing 12a.

In combination with the layer 45 of foam plastic I have discovered that a second layer 57 of the polyurethane foam will achieve even more effective results in the fourth stage separation of fuel and water droplets by helping to form larger droplets. The second layer 57 of foam plastic is placed adjacent the inner perforated wall member 48 and preferably outside of it directly adjacent the layer 35a of coalescing fiberglass material. The porosity of the layer 57 is of the order of 60 pores per square inch of surface. These pores, the tortuous passages through which the mixed hydrocarbon liquid and water must pass when it leaves the fiberglass layer 55, have a substantially uniform and relatively large size that allows a continuation of the coalescing process to take place therein so that larger water droplets will form and drop downward from the perforated inner wall 48. This arrangement would make possible the separation of the water droplets and the hydrocarbon fuel at a greater flow rate through the unit 10a even without a barrier 45, if desired. However, it is preferred that the barrier 45 be used to assure complete water separation for all flow rates.

The porosity of the first layer 45 of foam plastic around the central spring 53 is less (e.g., 45 pores per square inch of surface) than that of the second layer 57 of plastic, so that the large droplets formed in the second layer 57 cannot pass through the first layer 45 and must inevitably fall downward in the annular space 55 through the openings 56 and into the sump 14a.

In FIG. 5 is shown another modified form of combined filtering and separating device 10b having a cartridge 60 which is in all respects similar to the embodiment of FIG. 4 except that the layers 45 and 57 of foam plastic are replaced by a fourth stage water droplet barrier 61 made from a fine-mesh monofilament screen or some other fine mesh cloth. Such monofilament materials are well known in the liquid filtering art. The monofilament material is shaped in the form of the cylindrical barrier sleeve 61 and is preferably attached to the end wall members 50b and 51b and inside of a perforated cylindrical inner wall member 48b to form an annular space 62 adjacent thereto having a uniform thickness, e.g., 1/4 inch. The upper end of the barrier sleeve 61 is aligned with the opening 52 in the upper end wall member 51. Once wetted with fuel, the monofilament material will stop free water while allowing the hydrocarbon fuel to flow through it.

Thus, in the embodiment of FIG. 5, the fuel flows through the inlet passage 17b in the top member 15b and into an annular space 63 around the cartridge 60. The fuel then flows through a first stage unit 34b of relatively coarse fibrous material, an open space 37b formed by a spacing means 38b, a unit 35b of non-woven fabric material, and a coalescing stage 36b through the inner annular wall member 48b. The large water droplets that are formed as the liquid flows through the coalescing material 36b fall downward, and the filtered and water-separated fuel passes through the fine mesh monofilament barrier member 61 and upward out the central opening 52b and through the outlet 16b of the unit 10b. The water droplets falling downward pass through openings 70 in a base plate 13b and into the sump 14b of the housing 12b.

The filtering and water separating unit 10c in FIG. 6 is another modified form of the invention comprising a cartridge 80 having a fourth stage droplet barrier 81 that is arranged for flow therethrough from the inside-out. The various filtering stages are arranged in the same order with respect to the flow of the liquid through the cartridge 80 as in the previous embodiments and are retained between an inner spring member 53c and an outer perforated cylindrical wall member 47c, held together by end wall members 50c and 51c. The monofilament material forming the droplet barrier 81 is shaped as a cylindrical sleeve and is attached at the periphery of the end wall members 50c and 51c around the outer wall member 47c and forming therewith an annular space 82. The water droplets leaving the outer perforated wall 47c cannot get through the barrier 81 and ultimately fall downward through openings 83 in a base plate 13c and into the sump 14c of the housing 12c.

The unique filtering and water separating action of my invention which is common to all of the embodiments can be summarized clearly with reference again to FIG. 3 wherein an enlarged cross-section of a portion of the cartridge 11 of the embodiment of FIG. 1 is shown. When the fuel first enters the filtering element 11 it passes through the first stage 34 having the relatively coarse absorbent or adsorbent material having a cellular fibrous structure such as sisal. This stage serves to (1) remove gums, varnishes and tars from the fuel; (2) to remove larger contaminants in the range of 15 to 25 microns; (3) to serve as an emulsion breaker to break the water fuel emulsions, thereby forming small droplets that form on the outer side or the affluent side of this stage. As the fuel leaves the first stage 34 it passes through the open space 37 adjacent thereto that is formed by a spacing means 38 such as the coiled wire or string wrapped around the sisal stage 34, and it then enters the relatively fine second stage 35 composed of the non-woven fabric media. When the second stage layer 36 is wetted, it filters out the small contaminants in the hydrocarbon liquid in the range of approximately zero to five microns, and thus is provides the important function of protecting the fiberglass coalescing material 37. Glass fiber material is subject to filter sliming or coating, and once the fibers are coated, the coalescing action will drop off, causing what is known as an "invert." An invert is usually known as "water wrapped around fuel" with another layer of "fuel wrapped around water." This causes a light droplet that will be carried downstream by the velocity of the fuel. In other words, the fuel and water droplets are approximately the same weight. In the present invention this problem has been overcome by using the two filtering medias, namely, the cellular fibrous layer 34 and the non-woven cloth layer 35, with the annular space 38 in between them. It has been found that the layer 35 will protect the coalescing layer 36 by breaking the water fuel emulsion, at the same time causing the small contaminants to remain in the water passing through the layer 36.

In my invention even if some filter sliming of the glass fibers in the coalescing layer 36 is encountered after a long period of use, the fine drop coalescing action would still be usable. The water droplets would be smaller but upon passing through the coalescing layer 36 they would be stopped and controlled by the fourth stage barrier such as the foam plastic barrier 45 of FIG. 4 or the fine mesh monofilament cloth 61 shown in FIG. 5. As soon as the water droplets coming through the cartridge have any size at all, the droplet barrier will not allow them to pass through.

The unique operation of my device described above with reference to FIG. 3 takes place with either inside-out or outside-in flow as shown typically by the embodiments of FIGS. 5 and 6.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A combined filtering and water separating cartridge for hydrocarbon liquids, said cartridge having a generally cylindrical shape and comprising: a first, relatively coarse filtering stage formed by a layer of absorbent material; a second relatively fine filtering stage formed by a layer of non-woven fabric material adjacent said first layer; spacing means for maintaining a predetermined separation between said first and second layers; a third water-separating stage comprising a layer of coalescing material lying directly adjacent to said second layer; a fourth layer of porous material having a multiplicity of passages and located adjacent said third layer; a pervious wall member adjacent said fourth layer; a pervious water-droplet barrier formed from a fifth layer of porous material having a multiplicity of passages and fixed at a uniform distance from said pervious wall member, the passages of said fourth layer of porous material being uniformly larger than the passages of said fifth layer, whereby the water coalesced and formed into droplets within said fourth layer cannot pass through the passages of said fifth layer; and means for holding said layers of material together in the unitized form of said cartridge.

2. A combined filtering and water separating cartridge for hydrocarbon liquids, said cartridge having a generally cylindrical shape with a central cavity and comprising: a first, relatively coarse filtering stage formed by a first layer of absorbent cellular fibrous material; a second relatively fine filtering stage formed by a second layer of non-woven fabric material adjacent said first layer; spacing means for maintaining a predetermined separation between said first and second layers; a third water separating stage comprising a third layer of water coalescing glass fiber material lying directly adjacent to said second layer; a fourth layer of foam plastic material having a multiplicity of passages and located adjacent said third layer; a pervious wall member adjacent said fourth foam plastic layer; a pervious water-droplet barrier formed from a fifth layer of foam plastic material having a multiplicity of passages and fixed at a uniform distance from said wall member, the passages of said fourth layer of foam plastic being uniformly larger than the passages of said fifth layer of foam plastic, whereby the water coalesced and formed into droplets within said fourth layer cannot pass through the passages of said fifth layer; and means for holding said layers of material together in the unitized form of said cartridge.

3. A device for separating water from a hydrocarbon liquid flowing through said device while simultaneously filtering out solid foreign particles and contaminants from the liquid, comprising: a housing having inlet and outlet passages; a cartridge having a generally cylindrical shape and a central cavity, mounted within said housing and forming therewith an annular space around said cartridge; said cartridge comprising: a first filtering stage comprising a relatively coarse filtering media in communication with said inlet passage and formed by a first annular layer of absorbent material; a second stage comprising a relatively fine filtering media formed by a second annular layer of non-woven fabric material adjacent said first layer; spacing means for providing and maintaining an annular space between said first and second layers; a third stage comprising a third layer of water coalescing material lying directly adjacent to said second layer; a fourth stage comprising a pervious water-droplet barrier fixed at a uniform distance from and forming an annular area adjacent said third layer and having a multiplicity of passages for allowing the passage of the pure hydrocarbon liquid and for arresting the coalesced water droplets passing from the said third layer; means for holding said first, second, third, and fourth stages together in a fixed unitized package to form said cartridge; support means for holding said cartridge in a predetermined position within said housing and adapted to cooperate with said housing to form a sump below said cartridge, and passages in said support means connecting said sump with said area adjacent said third layer of said cartridge; means for connecting said annular space around said cartridge and said central cavity thereof with said inlet and outlet passages in said housing; whereby a hydrocarbon liquid passing through the inlet of said housing is directed through said first, second, and third layers, the filtered hydrocarbon liquid thus leaving said housing through said outlet passage while water droplets separated therefrom fall into said sump.

4. The cartridge described in claim 3 wherein said droplet barrier comprises a fine mesh monofilament screen.

5. The cartridge described in claim 3 wherein said droplet barrier comprises a layer of foamed plastic material having a substantially uniform predetermined porosity.

6. The cartridge as described in claim 3 wherein said spacing means comprises a cord means arranged in spaced apart coils between said first and second annular layers of filtering media.

7. A device for separating water from a hydrocarbon liquid flowing through said device while simultaneously filtering out solid foreign particles and contaminants from the liquid, comprising: a housing having inlet and outlet passages; a cartridge having a generally cylindrical shape, a central cavity in communication with said housing outlet, being mounted within said housing and forming therewith an annular space around said cartridge in communication with said housing inlet; said cartridge comprising: and outer cylindrical pervious wall member; a first filtering stage adjacent said outer wall comprising a relatively coarse filtering media formed by a first annular layer of absorbent material; a second stage comprising a relatively fine filtering media formed by a second annular layer of non-woven fabric material adjacent said first layer; spacing means for providing and maintaining an annular space between said first and second layers; a third stage comprising a third layer of water coalescing material lying directly adjacent to said second layer; a fourth layer of porous plastic material having a multiplicity of passages and located adjacent said third layer; a perforated inner wall member adjacent said fourth layer of foam plastic; a pervious water-droplet barrier formed from a fifth layer of porous plastic material having a multiplictiy of passages and fixed at a uniform distance from said wall member, the passages of said fourth layer being uniformly larger than the passages of said fifth layer, whereby the water coalesced and formed into droplets within said third and fourth layers cannot pass through the passages of said fifth layer; and means for holding all of said layers together in a fixed unitized package to form said cartridge; support means for holding said cartridge in a predetermined position within said housing and adapted to cooperate with said housing to form a sump below said cartridge, and passages in said support means connecting said sump with said area adjacent said fourth layer of said cartridge; means for connecting said annular space around said cartridge and said central cavity thereof with said inlet and outlet passages in said housing; whereby a hydrocarbon liquid passing through the inlet of said housing is completely directed through all of said layers, the filtered hydrocarbon liquid thus leaving said housing through said outlet passage while water droplets separated therefrom fall into said sump.

References Cited by the Examiner

UNITED STATES PATENTS

| 2,657,808 | 11/1953 | Mankin | 210—307 X |
| 2,788,125 | 4/1957 | Webb. | |
| 2,864,505 | 12/1958 | Kasten. | |
| 2,911,101 | 11/1959 | Robinson | 210—315 X |
| 2,936,893 | 5/1960 | Arkoosh et al. | 210—315 X |
| 2,959,289 | 11/1960 | Figert et al. | 210—307 |
| 3,016,345 | 1/1962 | Price | 210—315 |
| 3,027,009 | 3/1962 | Price | 210—23 |
| 3,048,275 | 8/1962 | Headrick | 210—307 X |
| 3,061,107 | 10/1962 | Taylor. | |

FOREIGN PATENTS

| 1,253,094 | 12/1960 | France. |
| 858,127 | 1/1961 | Great Britain. |
| 880,537 | 10/1961 | Great Britain. |

REUBEN FRIEDMAN, *Primary Examiner.*

HERBERT L. MARTIN, *Examiner.*